(12) United States Patent
Camuffo

(10) Patent No.: US 12,500,618 B2
(45) Date of Patent: Dec. 16, 2025

(54) CALIBRATING WIRELESS CIRCUITRY WITH DIGITAL PREDISTORTION

(71) Applicant: Apple Inc., Cupertino, CA (US)

(72) Inventor: Andrea Camuffo, Munich (DE)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/740,865

(22) Filed: Jun. 12, 2024

(65) Prior Publication Data
US 2025/0096828 A1 Mar. 20, 2025

Related U.S. Application Data

(60) Provisional application No. 63/583,501, filed on Sep. 18, 2023.

(51) Int. Cl.
| | |
|---|---|
| H04K 1/02 | (2006.01) |
| H04B 1/04 | (2006.01) |
| H04L 25/03 | (2006.01) |
| H04L 25/49 | (2006.01) |

(52) U.S. Cl.
CPC ... H04B 1/0475 (2013.01); *H04B 2001/0425* (2013.01)

(58) Field of Classification Search
CPC .......... H04B 1/0475; H04B 2001/0425; H03F 1/3247
USPC ........................................ 375/296, 297, 260
See application file for complete search history.

(56) References Cited

U.S. PATENT DOCUMENTS

| | | | |
|---|---|---|---|
| 7,149,257 B2 | 12/2006 | Braithwaite | |
| 8,046,199 B2 | 10/2011 | Copeland | |
| 9,325,357 B2 | 4/2016 | Volokhine et al. | |
| 10,742,474 B2 | 8/2020 | Khlat et al. | |
| 11,394,412 B2 | 7/2022 | Menkhoff et al. | |
| 11,431,300 B2 | 8/2022 | Barbu et al. | |

(Continued)

OTHER PUBLICATIONS

R. Neil Braithwaite, "Closed-Loop Digital Predistortion (DPD) Using an Observation Path With Limited Bandwidth", Transactions on Microwave Theory and Techniques, Feb. 2015, pp. 726-736, vol. 63, No. 2, IEEE.

(Continued)

*Primary Examiner* — Phuong Phu

(74) *Attorney, Agent, or Firm* — Treyz Law Group; Jason Tsai

(57) ABSTRACT

An electronic device may include wireless circuitry having a radio-frequency amplifier. A method for calibrating the wireless circuitry is provided that includes characterizing a linear transformation between an input of the radio-frequency amplifier and an input of a feedback receiver, where the radio-frequency amplifier has an output that is coupled to the input of the feedback receiver via a filter and a radio-frequency coupler, obtaining a filter model based on the characterized linear transformation, and generating memory digital predistortion (mDPD) coefficients for a digital predistortion block coupled to the input of the radio-frequency amplifier based on the filter model. The generation of the mDPD coefficients can alternatively be based on an inverse filter model and can further include minimizing an error signal computed from a difference between a predistorted signal output from the digital predistortion block and a demodulated signal output from the feedback receiver.

19 Claims, 13 Drawing Sheets

(56) References Cited

U.S. PATENT DOCUMENTS

| | | |
|---|---|---|
| 2023/0062458 A1 | 3/2023 | Namboodiri et al. |
| 2023/0179155 A1* | 6/2023 | Alon .................... H03F 1/3247 370/310 |
| 2023/0238991 A1 | 7/2023 | Wang et al. |

OTHER PUBLICATIONS

John Wood, "Digital Pre-Distortion Techniques for RF Power Amplifiers", Jan. 27, 2010, pp. 1-48, Freescale Semiconductor, Inc.

Patrick Pratt et al., "Ultrawideband Digital Predistortion (DPD): The Rewards (Power and Performance) and Challenges of Implementation in Cable Distribution Systems", Jul. 2017, pp. 1-7, vol. 51, No. 7, Analog Dialogue.

\* cited by examiner

Symbol N

Symbol (N+1)

CALIBRATING WIRELESS CIRCUITRY WITH DIGITAL PREDISTORTION

This application claims the benefit of U.S. Provisional Patent Application No. 63/583,501, filed Sep. 18, 2023, which is hereby incorporated by reference herein in its entirety.

FIELD

This disclosure relates generally to electronic devices and, more particularly, to electronic devices with wireless communications circuitry.

BACKGROUND

Electronic devices are often provided with wireless communications capabilities. An electronic device with wireless communications capabilities has wireless communications circuitry with one or more antennas. Wireless transceiver circuitry in the wireless communications circuitry uses the antennas to transmit and receive radio-frequency signals.

Radio-frequency signals transmitted by an antenna are often fed through one or more power amplifiers, which are configured to amplify low power analog signals to higher power signals more suitable for transmission through the air over long distances. It can be challenging to operate a power amplifier for an electronic device at peak efficiency.

SUMMARY

An electronic device may include wireless communications circuitry. The wireless communications circuitry may include one or more processors or signal processing blocks for generating baseband signals, a transceiver for receiving the digital signals and for generating corresponding radio-frequency signals, and one or more radio-frequency power amplifiers configured to amplify the radio-frequency signals for transmission by one or more antennas in the electronic device.

An aspect of the disclosure provides a method of operating wireless circuitry having a radio-frequency amplifier, where the method includes: characterizing a linear transformation between an input of the radio-frequency amplifier and an input of a feedback receiver, where the radio-frequency amplifier has an output that is coupled to the input of the feedback receiver via a filter and a radio-frequency coupler; obtaining a filter model based on the characterized linear transformation between the input of the radio-frequency amplifier and the input of the feedback receiver; generating memory digital predistortion (mDPD) coefficients based on the filter model; and transmitting a predistorted signal based on the mDPD coefficients. The method can further include applying the mDPD coefficients to a digital predistortion block coupled to the input of the radio-frequency amplifier. Generating the mDPD coefficients can include filtering signals output from the digital predistortion block and minimizing an error signal computed from a difference between a predistorted signal output from the digital predistortion block and a demodulated signal output from the feedback receiver. The wireless circuitry may be operable in a first power mode and a second power mode, where the digital predistortion block is deactivated during the first power mode and is activated during the second power mode.

An aspect of the disclosure provides a method that includes: obtaining a filter model that characterizes effects between an input of a radio-frequency amplifier and an input of a feedback receiver, wherein the radio-frequency amplifier has an output that is coupled to the input of the feedback receiver via a filter and a radio-frequency coupler; obtaining an inverse filter model based on the filter model; generating memory digital predistortion (mDPD) coefficients based on the inverse filter model; and transmitting a predistorted signal based on the mDPD coefficients. Generating the mDPD coefficients can include using the inverse filter model to filter signals output from the radio-frequency amplifier and minimizing an error signal computed from a difference between the predistorted signal and a demodulated signal output from the feedback receiver.

DETAILED DESCRIPTION

Figure 1:
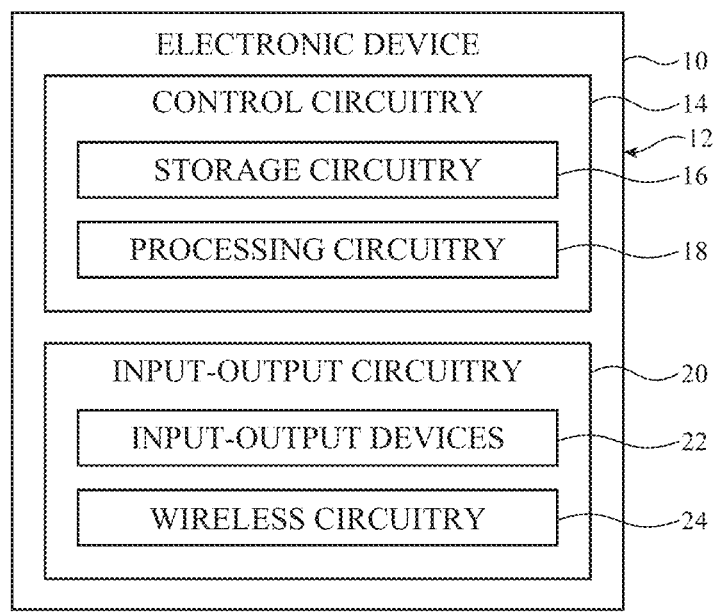
FIG. 1 is a diagram of an illustrative electronic device having wireless circuitry in accordance with some embodiments.

An electronic device such as device 10 of FIG. 1 may be provided with wireless circuitry. The wireless circuitry may include a processor for generating baseband signals, a transceiver for upconverting (mixing) the baseband signals into radio-frequency signals, a radio-frequency (RF) amplifier for amplifying the radio-frequency signals, and an antenna for radiating the amplified radio-frequency signals. The transceiver can include a digital predistortion (DPD) circuit configured to predistort the baseband signal for compensating any non-linearities in the transmit path to obtain better spectral efficiency and to reduce interference with adjacent channels.

Certain radio-frequency transmit architectures can include a filter coupled to the output of the radio-frequency amplifier and a radio-frequency coupler that is coupled between the filter and the antenna. The RF coupler may be coupled to a feedback receiver configured to generate a corresponding demodulated signal. The digital predistortion circuit and/or other components along the transmit path can be adjusted based on this demodulated signal. The DPD circuit can be configured to implement a type of digital predistortion sometimes referred to as memory digital predistortion ("mDPD"). The DPD circuit can be deactivated at low power levels and can be activated at high power levels. Memory DPD techniques are not capable of distinguishing the linear characteristics of the filter at the output of the RF amplifier and the parasitic (rippling) effects of a feedback path connecting the RF coupler to the feedback receiver. Potential negative effects caused by this parasitic rippling can be exacerbated for applications employing intraband carrier aggregation and for applications with cascaded filters.

In accordance with an embodiment, a calibration process is provided that does not compensate for the filter at the output of the RF amplifier. This ensures that the mDPD only counteracts or compensates the non-linearity issues including the parasitic rippling but not the linear contribution of the filter, which ensures that the signal spectrum does not change abruptly with the activation and deactivation of the DPD circuit. A first calibration step can be performed while the RF amplifier is biased using a high voltage level and amplifies a relatively small signal to ensure that the RF amplifier is operating in a linear region of operation (a linear mode). The first calibration step can thus be used to learn the linear effects of the filter and the parasitic rippling effects on the feedback path. With this information, a filter model can be constructed that exhibits the same frequency response as the filter and the feedback path. This filter model can be incorporated into the indirect learning algorithm of the mDPD process to effectively de-embed the filter from the learning algorithm. In one embodiment, the filter model can be inserted at an input port of the RF amplifier during the mDPD indirect learning process. In another embodiment, an inverse filter model can be inserted at an output port of the RF amplifier during the mDPD indirect learning process. In yet another embodiment, the filter model can be inserted at an input port of the DPD circuit during the mDPD indirect learning process. Calibrating wireless circuitry in this way can be technically advantageous and beneficial to achieve better accuracy for applications with intraband carrier aggregation, to maintain channel stability when transitioning between low power and high power, to help alleviate any bandwidth constraints of the feedback receiver, and might also help reduce the number of calibration points needed across different frequency bands.

Electronic device 10 of FIG. 1 may be a computing device such as a laptop computer, a desktop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, a wireless internet-connected voice-controlled speaker, a home entertainment device, a remote control device, a gaming controller, a peripheral user input device, a wireless base station or access point, equipment that implements the functionality of two or more of these devices, or other electronic equipment.

As shown in the functional block diagram of FIG. 1, device 10 may include components located on or within an electronic device housing such as housing 12. Housing 12, which may sometimes be referred to as a case, may be formed from plastic, glass, ceramics, fiber composites, metal (e.g., stainless steel, aluminum, metal alloys, etc.), other suitable materials, or a combination of these materials. In some embodiments, parts or all of housing 12 may be formed from dielectric or other low-conductivity material (e.g., glass, ceramic, plastic, sapphire, etc.). In other embodiments, housing 12 or at least some of the structures that make up housing 12 may be formed from metal elements.

Device 10 may include control circuitry 14. Control circuitry 14 may include storage such as storage circuitry 16. Storage circuitry 16 may include hard disk drive storage, nonvolatile memory (e.g., flash memory or other electrically-programmable-read-only memory configured to form a solid-state drive), volatile memory (e.g., static or dynamic random-access-memory), etc. Storage circuitry 16 may include storage that is integrated within device 10 and/or removable storage media.

Control circuitry 14 may include processing circuitry such as processing circuitry 18. Processing circuitry 18 may be used to control the operation of device 10. Processing circuitry 18 may include on one or more microprocessors, microcontrollers, digital signal processors, host processors, baseband processor integrated circuits, application specific integrated circuits, central processing units (CPUs), etc. Control circuitry 14 may be configured to perform operations in device 10 using hardware (e.g., dedicated hardware or circuitry), firmware, and/or software. Software code for performing operations in device 10 may be stored on storage circuitry 16 (e.g., storage circuitry 16 may include non-transitory (tangible) computer readable storage media that stores the software code). The software code may sometimes be referred to as program instructions, software, data, instructions, or code. Software code stored on storage circuitry 16 may be executed by processing circuitry 18.

Control circuitry 14 may be used to run software on device 10 such as satellite navigation applications, internet browsing applications, voice-over-internet-protocol (VOIP) telephone call applications, email applications, media playback applications, operating system functions, etc. To support interactions with external equipment, control circuitry 14 may be used in implementing communications protocols. Communications protocols that may be implemented using control circuitry 14 include internet protocols, wireless local area network (WLAN) protocols (e.g., IEEE 802.11 protocols-sometimes referred to as Wi-Fi®), protocols for other short-range wireless communications links such as the Bluetooth® protocol or other wireless personal area network (WPAN) protocols, IEEE 802.11ad protocols (e.g., ultra-wideband protocols), cellular telephone protocols (e.g., 3G protocols, 4G (LTE) protocols, 5G protocols, etc.), antenna diversity protocols, satellite navigation system protocols (e.g., global positioning system (GPS) protocols, global navigation satellite system (GLONASS) protocols, etc.), antenna-based spatial ranging protocols (e.g., radio detection and ranging (RADAR) protocols or other desired range detection protocols for signals conveyed at millimeter and centimeter wave frequencies), or any other desired communications protocols. Each communications protocol may be associated with a corresponding radio access technology (RAT) that specifies the physical connection methodology used in implementing the protocol.

Device 10 may include input-output circuitry 20. Input-output circuitry 20 may include input-output devices 22. Input-output devices 22 may be used to allow data to be supplied to device 10 and to allow data to be provided from device 10 to external devices. Input-output devices 22 may include user interface devices, data port devices, and other input-output components. For example, input-output devices 22 may include touch sensors, displays (e.g., touch-sensitive and/or force-sensitive displays), light-emitting components such as displays without touch sensor capabilities, buttons (mechanical, capacitive, optical, etc.), scrolling wheels, touch pads, key pads, keyboards, microphones, cameras, buttons, speakers, status indicators, audio jacks and other audio port components, digital data port devices, motion sensors (accelerometers, gyroscopes, and/or compasses that detect motion), capacitance sensors, proximity sensors, magnetic sensors, force sensors (e.g., force sensors coupled to a display to detect pressure applied to the display), etc. In some configurations, keyboards, headphones, displays, pointing devices such as trackpads, mice, and joysticks, and other input-output devices may be coupled to device 10 using wired or wireless connections (e.g., some of input-output devices 22 may be peripherals that are coupled to a main processing unit or other portion of device 10 via a wired or wireless link).

Input-output circuitry 20 may include wireless circuitry 24 to support wireless communications. Wireless circuitry 24 (sometimes referred to herein as wireless communications circuitry 24) may include one or more antennas. Wireless circuitry 24 may also include baseband processor circuitry, transceiver circuitry, amplifier circuitry, filter circuitry, switching circuitry, radio-frequency transmission lines, and/or any other circuitry for transmitting and/or receiving radio-frequency signals using the antenna(s).

Wireless circuitry 24 may transmit and/or receive radio-frequency signals within a corresponding frequency band at radio frequencies (sometimes referred to herein as a communications band or simply as a "band"). The frequency bands handled by wireless circuitry 24 may include wireless local area network (WLAN) frequency bands (e.g., Wi-Fi® (IEEE 802.11) or other WLAN communications bands) such as a 2.4 GHz WLAN band (e.g., from 2400 to 2480 MHz), a 5 GHz WLAN band (e.g., from 5180 to 5825 MHz), a Wi-Fi® 6E band (e.g., from 5925-7125 MHZ), and/or other Wi-Fi® bands (e.g., from 1875-5160 MHz), wireless personal area network (WPAN) frequency bands such as the 2.4 GHz Bluetooth® band or other WPAN communications bands, cellular telephone frequency bands (e.g., bands from about 600 MHz to about 5 GHz, 3G bands, 4G LTE bands, 5G New Radio Frequency Range 1 (FR1) bands below 10 GHz, 5G New Radio Frequency Range 2 (FR2) bands between 20 and 60 GHz, etc.), cellular sidebands, 6G bands between 100-1000 GHz (e.g., sub-THz, THz, tremendously high frequency or THF bands, etc.), other centimeter or millimeter wave frequency bands between 10-300 GHz, near-field communications frequency bands (e.g., at 13.56 MHz), satellite navigation frequency bands (e.g., a GPS band from 1565 to 1610 MHz, a Global Navigation Satellite System (GLONASS) band, a BeiDou Navigation Satellite System (BDS) band, etc.), ultra-wideband (UWB) frequency bands that operate under the IEEE 802.15.4 protocol and/or other ultra-wideband communications protocols, communications bands under the family of 3GPP wireless communications standards, communications bands under the IEEE 802.XX family of standards, and/or any other desired frequency bands of interest.

Figure 2:
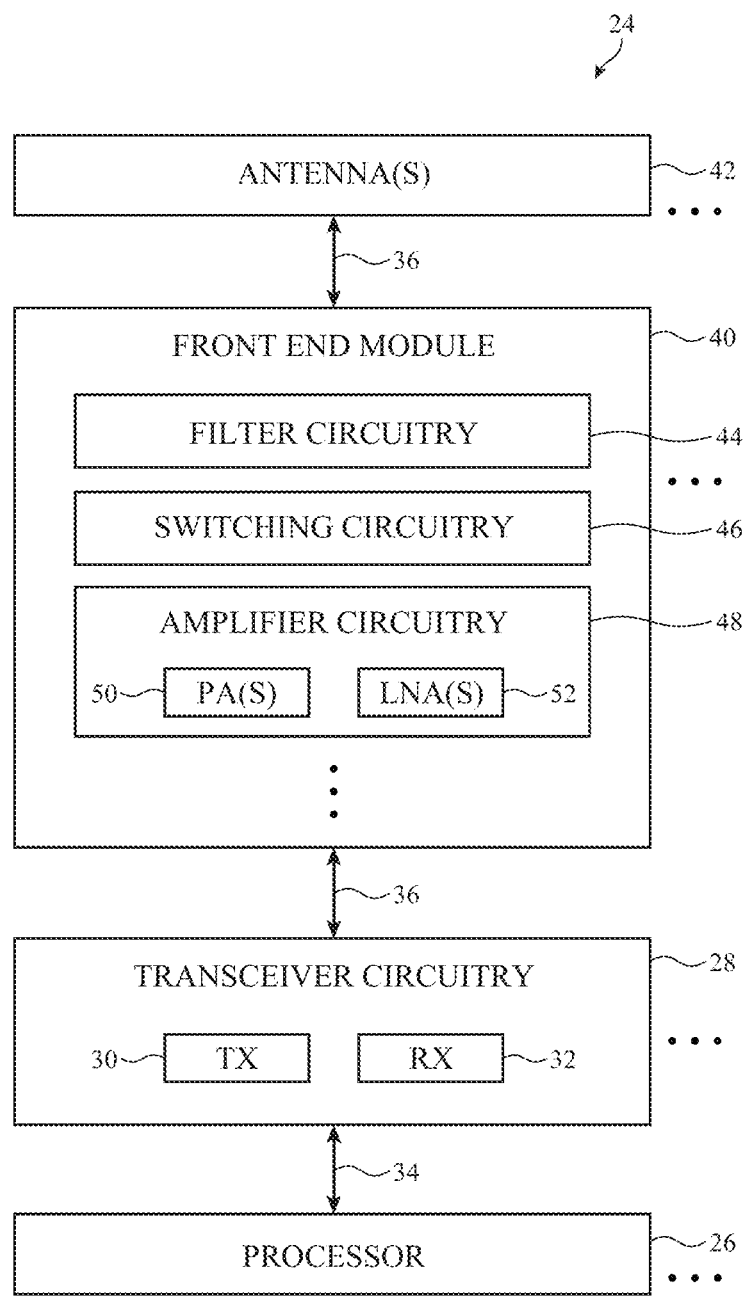
FIG. 2 is a diagram of illustrative wireless circuitry having amplifiers in accordance with some embodiments.

FIG. 2 is a diagram showing illustrative components within wireless circuitry 24. As shown in FIG. 2, wireless circuitry 24 may include a processor such as processor 26, radio-frequency (RF) transceiver circuitry such as radio-frequency transceiver 28, radio-frequency front end circuitry such as radio-frequency front end module (FEM) 40, and antenna(s) 42. Processor 26 may be a baseband processor, application processor, general purpose processor, microprocessor, microcontroller, digital signal processor, host processor, application specific signal processing hardware, power management unit, or other type of processor. Processor 26 may be coupled to transceiver 28 over path 34. Transceiver 28 may be coupled to antenna 42 via radio-frequency transmission line path 36. Radio-frequency front end module 40 may be disposed on radio-frequency transmission line path 36 between transceiver 28 and antenna 42.

In the example of FIG. 2, wireless circuitry 24 is illustrated as including only a single processor 26, a single transceiver 28, a single front end module 40, and a single antenna 42 for the sake of clarity. In general, wireless circuitry 24 may include any desired number of processors 26, any desired number of transceivers 28, any desired number of front end modules 40, and any desired number of antennas 42. Each processor 26 may be coupled to one or more transceiver 28 over respective paths 34. Each transceiver 28 may include a transmitter circuit 30 configured to output uplink signals to antenna 42, may include a receiver circuit 32 configured to receive downlink signals from antenna 42, and may be coupled to one or more antennas 42 over respective radio-frequency transmission line paths 36. Each radio-frequency transmission line path 36 may have a respective front end module 40 disposed thereon. If desired, two or more front end modules 40 may be disposed on the same radio-frequency transmission line path 36. If desired, one or more of the radio-frequency transmission line paths 36 in wireless circuitry 24 may be implemented without any front end module disposed thereon.

Radio-frequency transmission line path 36 may be coupled to an antenna feed on antenna 42. The antenna feed may, for example, include a positive antenna feed terminal and a ground antenna feed terminal. Radio-frequency transmission line path 36 may have a positive transmission line signal path such that is coupled to the positive antenna feed terminal on antenna 42. Radio-frequency transmission line path 36 may have a ground transmission line signal path that is coupled to the ground antenna feed terminal on antenna 42. This example is illustrative and, in general, antennas 42 may be fed using any desired antenna feeding scheme. If desired, antenna 42 may have multiple antenna feeds that are coupled to one or more radio-frequency transmission line paths 36.

Radio-frequency transmission line path 36 may include transmission lines that are used to route radio-frequency antenna signals within device 10 (FIG. 1). Transmission lines in device 10 may include coaxial cables, microstrip transmission lines, stripline transmission lines, edge-coupled microstrip transmission lines, edge-coupled stripline transmission lines, transmission lines formed from combinations of transmission lines of these types, etc. Transmission lines in device 10 such as transmission lines in radio-frequency transmission line path 36 may be integrated into rigid and/or flexible printed circuit boards.

In performing wireless transmission, processor 26 may provide transmit signals (e.g., digital or baseband signals) to transceiver 28 over path 34. Transceiver 28 may further include circuitry for converting the transmit (baseband) signals received from processor 26 into corresponding radio-frequency signals. For example, transceiver circuitry 28 may include mixer circuitry for up-converting (or modulating) the transmit (baseband) signals to radio frequencies prior to transmission over antenna 42. The example of FIG. 2 in which processor 26 communicates with transceiver 28 is illustrative. In general, transceiver 28 may communicate with a baseband processor, an application processor, general purpose processor, a microcontroller, a microprocessor, or one or more processors within circuitry 18. Transceiver circuitry 28 may also include digital-to-analog converter (DAC) and/or analog-to-digital converter (ADC) circuitry for converting signals between digital and analog domains. Transceiver 28 may use transmitter (TX) 30 to transmit the radio-frequency signals over antenna 42 via radio-frequency transmission line path 36 and front end module 40. Antenna 42 may transmit the radio-frequency signals to external wireless equipment by radiating the radio-frequency signals into free space.

Front end module (FEM) 40 may include radio-frequency front end circuitry that operates on the radio-frequency signals conveyed (transmitted and/or received) over radio-frequency transmission line path 36. FEM 40 may, for example, include front end module (FEM) components such as radio-frequency filter circuitry 44 (e.g., low pass filters, high pass filters, notch filters, band pass filters, multiplexing circuitry, duplexer circuitry, diplexer circuitry, triplexer circuitry, etc.), switching circuitry 46 (e.g., one or more radio-frequency switches), radio-frequency amplifier circuitry 48 (e.g., one or more power amplifier circuits 50 and/or one or more low-noise amplifier circuits 52), impedance matching circuitry (e.g., circuitry that helps to match the impedance of antenna 42 to the impedance of radio-frequency transmission line 36), antenna tuning circuitry (e.g., networks of capacitors, resistors, inductors, and/or switches that adjust the frequency response of antenna 42), radio-frequency coupler circuitry, charge pump circuitry, power management circuitry, digital control and interface circuitry, and/or any other desired circuitry that operates on the radio-frequency signals transmitted and/or received by antenna 42. Each of the front end module components may be mounted to a common (shared) substrate such as a rigid printed circuit board substrate or flexible printed circuit substrate. If desired, the various front end module components may also be integrated into a single integrated circuit chip. If desired, amplifier circuitry 48 and/or other components in front end 40 such as filter circuitry 44 may also be implemented as part of transceiver circuitry 28.

Filter circuitry 44, switching circuitry 46, amplifier circuitry 48, and other circuitry may be disposed along radio-frequency transmission line path 36, may be incorporated into FEM 40, and/or may be incorporated into antenna 42 (e.g., to support antenna tuning, to support operation in desired frequency bands, etc.). These components, sometimes referred to herein as antenna tuning components, may be adjusted (e.g., using control circuitry 14) to adjust the frequency response and wireless performance of antenna 42 over time.

Transceiver 28 may be separate from front end module 40. For example, transceiver 28 may be formed on another substrate such as the main logic board of device 10, a rigid printed circuit board, or flexible printed circuit that is not a part of front end module 40. While control circuitry 14 is shown separately from wireless circuitry 24 in the example of FIG. 1 for the sake of clarity, wireless circuitry 24 may include processing circuitry that forms a part of processing circuitry 18 and/or storage circuitry that forms a part of storage circuitry 16 of control circuitry 14 (e.g., portions of control circuitry 14 may be implemented on wireless circuitry 24). As an example, processor 26 and/or portions of transceiver 28 (e.g., a host processor on transceiver 28) may form a part of control circuitry 14. Control circuitry 14 (e.g., portions of control circuitry 14 formed on processor 26, portions of control circuitry 14 formed on transceiver 28, and/or portions of control circuitry 14 that are separate from wireless circuitry 24) may provide control signals (e.g., over one or more control paths in device 10) that control the operation of front end module 40.

Transceiver circuitry 28 may include wireless local area network transceiver circuitry that handles WLAN communications bands (e.g., Wi-Fi® (IEEE 802.11) or other WLAN communications bands) such as a 2.4 GHz WLAN band (e.g., from 2400 to 2480 MHz), a 5 GHz WLAN band (e.g., from 5180 to 5825 MHz), a Wi-Fi® 6E band (e.g., from 5925-7125 MHz), and/or other Wi-Fi® bands (e.g., from 1875-5160 MHz), wireless personal area network transceiver circuitry that handles the 2.4 GHz Bluetooth® band or other WPAN communications bands, cellular telephone transceiver circuitry that handles cellular telephone bands (e.g., bands from about 600 MHz to about 5 GHZ, 3G bands, 4G LTE bands, 5G New Radio Frequency Range 1 (FR1) bands below 10 GHz, 5G New Radio Frequency Range 2 (FR2) bands between 20 and 60 GHz, etc.), near-field communications (NFC) transceiver circuitry that handles near-field communications bands (e.g., at 13.56 MHz), satellite navigation receiver circuitry that handles satellite navigation bands (e.g., a GPS band from 1565 to 1610 MHz, a Global Navigation Satellite System (GLONASS) band, a BeiDou Navigation Satellite System (BDS) band, etc.), ultra-wideband (UWB) transceiver circuitry that handles communications using the IEEE 802.15.4 protocol and/or other ultra-wideband communications protocols, and/or any other desired radio-frequency transceiver circuitry for covering any other desired communications bands of interest.

Wireless circuitry 24 may include one or more antennas such as antenna 42. Antenna 42 may be formed using any desired antenna structures. For example, antenna 42 may be an antenna with a resonating element that is formed from loop antenna structures, patch antenna structures, inverted-F antenna structures, slot antenna structures, planar inverted-F antenna structures, helical antenna structures, monopole antennas, dipoles, hybrids of these designs, etc. Two or more antennas 42 may be arranged into one or more phased antenna arrays (e.g., for conveying radio-frequency signals at millimeter wave frequencies). Parasitic elements may be included in antenna 42 to adjust antenna performance. Antenna 42 may be provided with a conductive cavity that backs the antenna resonating element of antenna 42 (e.g., antenna 42 may be a cavity-backed antenna such as a cavity-backed slot antenna).

As described above, front end module 40 may include one or more power amplifiers (PA) circuits 50 in the transmit (uplink) path. A power amplifier 50 (sometimes referred to as radio-frequency amplifier, transmit amplifier, or amplifier) may be configured to amplify a radio-frequency signal without changing the signal shape, format, or modulation. Amplifier 50 may, for example, be used to provide 10 dB of gain, 20 dB of gain, 10-20 dB of gain, less than 20 dB of gain, more than 20 dB of gain, or other suitable amounts of gain.

Figure 3:
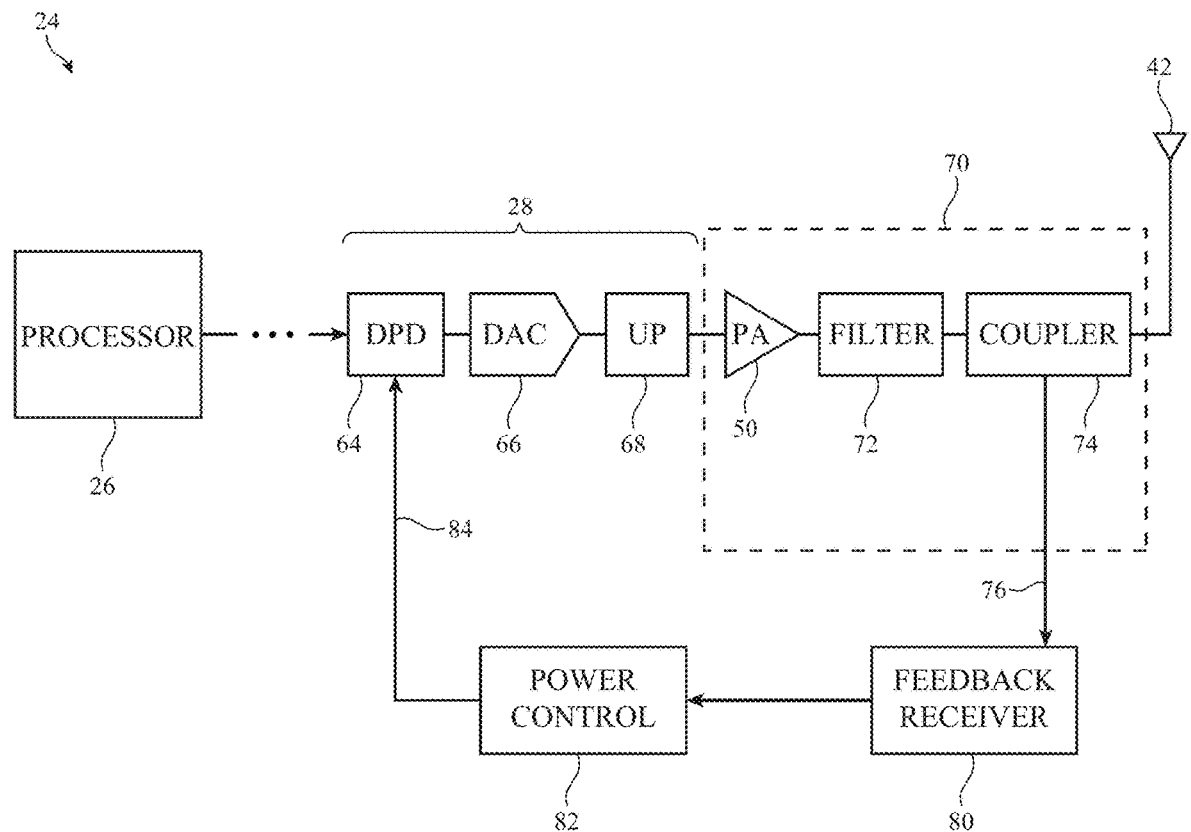
FIG. 3 is a diagram of illustrative wireless circuitry having a radio-frequency amplifier coupled to a feedback receiver and a digital predistortion circuit in accordance with some embodiments.
Figure 4:
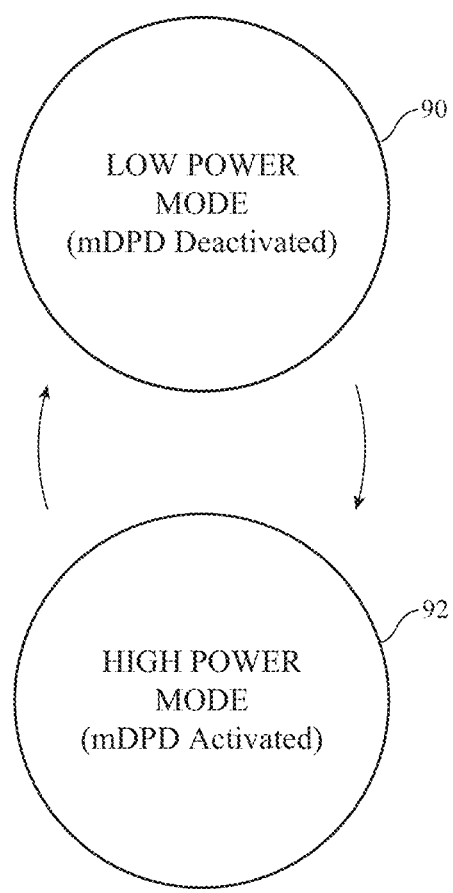
FIG. 4 is a diagram showing how the wireless circuitry shown in FIG. 3 can be operated in at least two modes in accordance with some embodiments.

FIG. 3 is a diagram of an illustrative transmit path of wireless circuitry 24. As shown in FIG. 3, wireless circuitry 24 may include processor 26 configured to generate baseband signals, a digital predistortion (DPD) circuit such as digital predistortion circuit 64, a data converter such as digital-to-analog converter (DAC) 66, an upconversion circuit such as upconverter 68, a radio-frequency power amplifier circuit such as amplifier 50, a filter such as transmit filter 72, a coupling circuit such as radio-frequency coupler 74, and an antenna 42 configured to radiate radio-frequency signals output from amplifier 50.

Processor 26 may represent one or more processors such as a baseband processor, an application processor, a digital signal processor, a microcontroller, a microprocessor, a central processing unit (CPU), a programmable device, a combination of these circuits, and/or one or more processors within circuitry 18. Processor 26 may be configured to generate digital (baseband) signals. Signals generated at the output of processor 26 are sometimes referred to as baseband signals, digital signals, or transmit signals. As examples, the digital signals generated by processor 26 may include in-phase (I) and quadrature-phase (Q) signals, radius and phase signals, or other digitally-coded signals.

The digital predistortion (DPD) circuit 64 may receive the digital baseband signals from processor 26 and may predistort the received digital baseband signals (e.g., to alter the gain response of the digital baseband signals) to generate corresponding predistorted digital baseband signals. Predistorting signals in this way can help equalize a non-linear gain behavior and/or a non-linear phase-shift behavior of amplifier 50 so that the overall response of signals being transmitted through amplifier 50 is linearized. Digital predistortion circuit 64 can be selectively activated. When predistortion circuit 64 is activated or switched into use, predistortion circuit 64 can generate predistorted digital baseband signal. When predistortion circuit 64 is deactivated or switched out of use (bypassed), the digital baseband signals output from processor 26 can pass through circuit 64 without being predistorted.

A digital predistortion circuit can be of a memoryless type or a memory type. Memory digital predistortion, sometimes referred to herein as "mDPD," extends the concept of conventional digital predistortion by taking in account not only the current input signal but also the past (historical) input signals and their corresponding distorted signals. Memory DPD thus allows for a more accurate and effective correction of non-linearities, especially in amplifiers that exhibit memory effects. Memory effects in amplifiers refer to the phenomenon that the distortion introduced by an amplifier is not just dependent on the instantaneous input signal but also on the previous input history, which can lead to complex non-linear behaviors that are challenging to compensate for using convention linear and memoryless DPD techniques. Device configurations in which DPD circuit 64 is a memory DPD circuit are sometimes described as an example herein to avail of the benefits of the mDPD algorithm.

The digital baseband signals output from digital predistortion circuit 64 (whether or not distorted by circuit 64) may be converted from the digital domain into the analog domain using digital-to-analog converter 66 and then upconverted (modulated) to radio frequencies, using upconverter 68, from the baseband frequency range (which is typically in the range of a couple hundred kHz to a couple hundred MHz) to radio frequencies in the range of hundreds of MHz or in the GHz range. Upconverter 68 is sometimes referred to as a radio-frequency modulator or a radio-frequency mixer. The DPD circuit 64, DAC 66, and upconverter 68 can sometimes be considered to be part of transceiver 28.

The upconverted radio-frequency signals may be fed to an input port of amplifier 50. Amplifier 50 may have an output port that is coupled to filter 72. Filter 72 may be a bandpass filter, a narrowband filter, a duplexer, can include other switching circuitry, and/or may include other components that can be formed as part of circuities 44 and 46 in FIG. 2. Filter 72 can sometimes be referred to herein as a transmit filter that is configured to improve the spectral performance of wireless circuitry 24. Signals output from amplifier 50 can be referred to as amplified radio-frequency signals. Signals output from filter 72 can be referred to as filtered radio-frequency signals.

Radio-frequency coupler 74 may be coupled between transmit filter 72 and antenna 42. Radio-frequency coupler 74 can be configured to couple or convey at least a portion of the filtered radio-frequency signals to feedback receiver circuit 80 via a feedback path 76. Radio-frequency amplifier 50, filter 72 (and other filter/switching circuitry) and coupler 74 are sometimes considered to be part of a front end module (see dotted box 70 in FIG. 3). Coupler 74 should be disposed after the transmit filter 72 to ensure that coupler 74 is as close to antenna 42 as possible (to improve the accuracy of the signal received by the feedback receiver 80) and to help minimize the cost and size of the overall front end module 70, especially for front end modules having multiple parallel amplifier cores each coupled to potentially multiple transmit filters. A different placement of coupler 74 would undesirably require the use of multiple RF couplers, which would increase the size and cost of front end module 70. The example of FIG. 3 in which coupler 74 is included as part of the front end module 70 is illustrative. In other embodiments, RF coupler 74 can alternatively be implemented as a separate component from the front end module 70.

Feedback receiver 80 can be configured to a receive a portion of the filtered radio-frequency signals from coupler 74 via feedback path 76. Feedback receiver 80 can include a downconversion (demodulation) circuit and a data conversion circuit such as an analog-to-digital converter (ADC) for downconverting or demodulating the feedback signal from radio-frequencies to a baseband frequency and for converting the feedback signal from the analog domain to the digital domain. Configured in this way, feedback receiver 80 can generate a corresponding demodulated digital feedback signal at its output. A power control circuit such as power controller 82 can receive the demodulated signal from feedback receiver 80 and can output a corresponding control signal for controlling one or more components along the transmit path. In the example of FIG. 3, power controller 82 may output a control signal on path 84 for adjusting digital predistortion circuit 64. For example, power controller 82 may be configured to compute coefficients for adjusting DPD circuit 64. This is illustrative. Power controller 82 can be configured to adjust other components along the transmit path.

Power controller 82 may be configured to implement an average power tracking algorithm (e.g., a technique for maintaining the average output power of amplifier 50 within a desired target range), an automatic power control algorithm (e.g., a technique for automatically controlling the output power of amplifier 50, which might include closed-loop power control or dynamic power control), an automatic gain control algorithm (e.g., a technique for maintaining a consistent output power level regardless of variations in the input signal strength), or other power control algorithms. Device configurations in which controller 82 is configured to implement an average power tracking algorithm or other power control algorithms are sometimes described herein as an example.

Figure 5A:
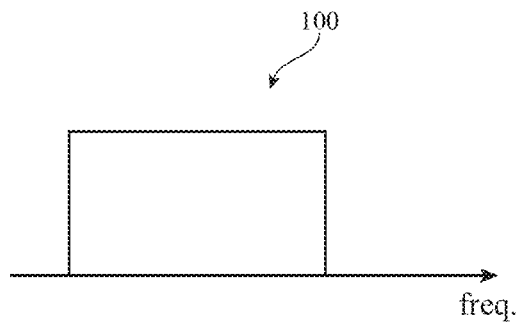
FIG. 5A shows a frequency spectrum of an illustrative ideal transmit signal that can be received at an amplifier input during a low power mode in accordance with some embodiments.
Figure 5B:
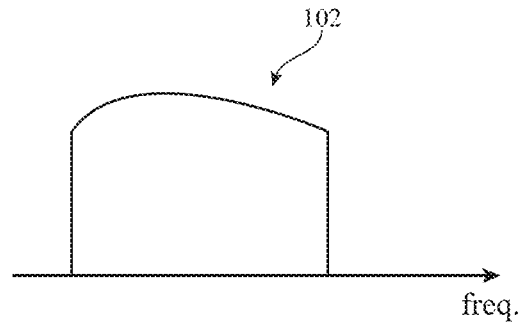
FIG. 5B shows a frequency spectrum of an illustrative signal that can be generated at a transmit filter output during the low power mode in accordance with some embodiments.

In accordance with some embodiments, the transmit circuitry in wireless circuitry 24 of the type described in connection with FIG. 3 may be operable in at least a first (low power) mode 90 and a second (high power) mode 92. When wireless circuitry 24 is operated in low power mode 90, the mDPD algorithm is deactivated by bypassing or idling DPD circuit 64. When wireless circuitry 24 is operated in high power mode 92, the mDPD algorithm can be activated by switching into use the DPD circuit 64. FIG. 5A shows a frequency spectrum of an illustrative ideal transmit signal 100 that can be received at an input port of amplifier 50 during the low power mode 90 when mDPD is deactivated. As shown in FIG. 5A, the ideal transmit signal 100 can have a flat spectral response. FIG. 5B shows a frequency spectrum of an illustrative signal 102 that can be generated at the output of transmit filter 72 during the low power mode 90. As shown in FIG. 5B, signal 102 can exhibit some (non-flat) spectral rippling due to the amplifier and filter responses. Since mDPD is deactivated during the low power mode 90, the transmit signal 102 will be sent to antenna 42 without any attempt to compensate for the impact of the transmit filter response. During the low power mode 90, signals output from amplifier 50 can be less than 10 dBm, less than 15 dB, less than 20 dBm, less than 30 dBm, or other power threshold. Signals output from amplifier 50 exceeding such power threshold will require operating wireless circuitry 24 in the high power mode 92.

Figure 6A:
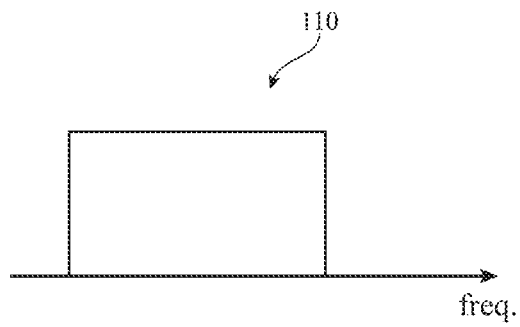
FIG. 6A shows a frequency spectrum of an illustrative ideal transmit signal that can be received at an amplifier input during a high power mode.
Figure 6B:
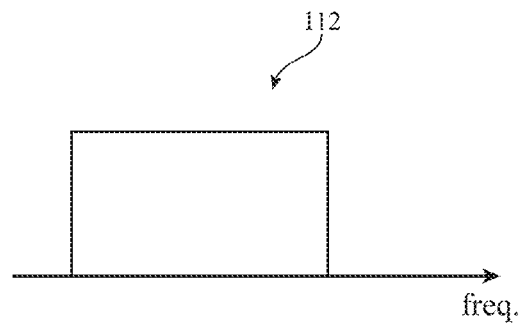
FIG. 6B shows a frequency spectrum of an illustrative ideal signal that can be generated at a transmit filter output during the high power mode.

FIG. 6A shows a frequency spectrum of an illustrative ideal transmit signal 110 that can be received at an input port of amplifier 50 during the high power mode 92 when mDPD is now activated. As shown in FIG. 6A, the ideal transmit signal 110 can have a flat spectral response. FIG. 6B shows a frequency spectrum of an illustrative signal 112 that can be generated at the output of transmit filter 72 during the high power mode 92. As shown in FIG. 6B, signal 112 can now exhibit a flat spectral response since mDPD is activated during the high power mode 92 to effectively "flatten" any rippling that would have been caused by the amplifier and filter responses. While the flattened signal 112 is clean, signal 112 in reality does not offer better performance than signal 102 with the filter rippling. This ideal flattened signal 112 also assumes an ideal feedback path characteristic on line 76 (i.e., the feedback path 76 does not include any parasitics).

Figure 7A:
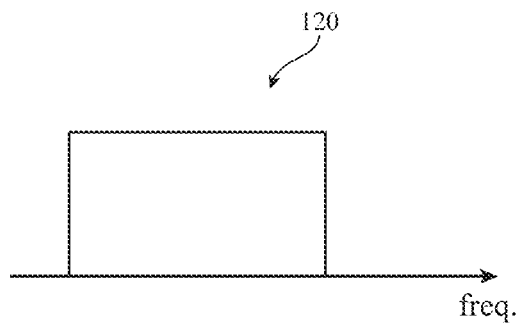
FIG. 7A shows a frequency spectrum of an illustrative ideal transmit signal that can be received at an amplifier input during the high power mode.
Figure 7B:
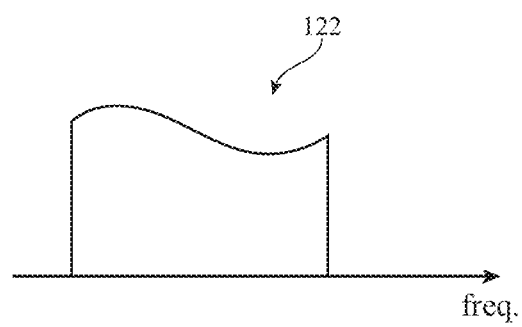
FIG. 7B shows a frequency spectrum of an illustrative signal exhibiting ripple that can be received at a feedback receiver input during the high power mode.

In practice, however, the feedback path 76 connecting the RF coupler 74 to feedback receiver 80 can be fairly long and can introduce additional parasitic loading effects. Such parasitics on feedback path 76 can cause parasitic rippling on the signal that is ultimately received by feedback receiver 80. FIG. 7A shows a frequency spectrum of an illustrative ideal transmit signal 120 that can be received at an input port of amplifier 50 during the high power mode 92 when mDPD is activated. As shown in FIG. 7A, the ideal transmit signal 120 can have a flat spectral response. FIG. 7B shows a frequency spectrum of an illustrative signal 122 that can be seen at an input port of feedback receiver 80 during the high power mode 92. As shown in FIG. 7B, signal 122 can exhibit a non-flat spectral response even when mDPD is activated during the high power mode 92. The rippling in signal 122 can be caused by the parasitic effects on feedback path 76 and can therefore sometimes be referred to as "parasitic rippling."

The rippling in signal 102 as shown in FIG. 5B and the parasitic rippling in signal 122 as shown in FIG. 7B are not problematic for certain modulation schemes such as Orthogonal Frequency Division Multiplexing (OFDM) schemes since OFDM techniques are robust against this type of signal distortion. Thus, the flattening of signal 112 is not a real benefit, as it does not provide any significant improvement such as to improve throughput. When mDPD is activated in the high power mode 92, an mDPD learning algorithm can be run to obtain or learn coefficients for controlling the DPD circuit 64. Such coefficients that can be generated by controller 82 can sometimes be referred to as "mDPD coefficients." Such training of the mDPD coefficients may learn all the impairments or parasitic effects of the feedback path 76. These effects, however, do not affect the transmit signal that is conveyed to antenna 42, as they appear only within coupler 74 and between coupler 74 and the input port of feedback receiver 80. This means that the mDPD learning process may cancel the characteristics of filter 72 but impress on the transmit signal being conveyed to antenna 42 an opposite parasitic rippling effect that is seen on feedback path 76. While such distortions, which are primarily linear effects, might not be detrimental to wireless performance metrics such as error vector magnitude (EVM), they may become problematic for setting correct power levels for intraband carrier aggregation.

Figure 8A:
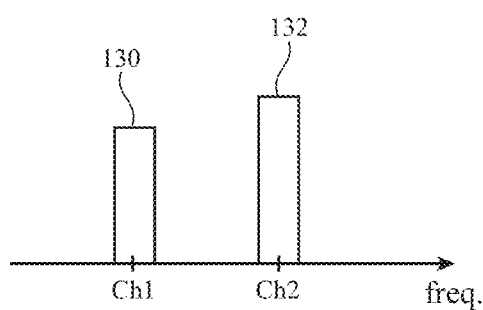
FIG. 8A shows a frequency spectrum of an illustrative signal with two intraband carriers that can be received at an amplifier input and that are separately scaled to account for a known filter profile during the low power mode in accordance with some embodiments.
Figure 8B:
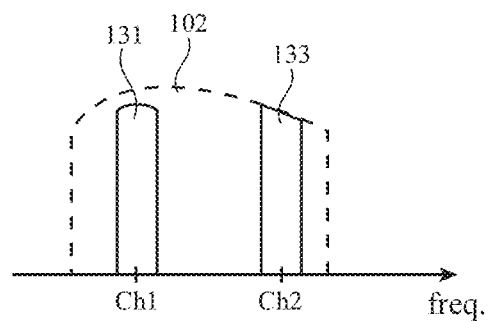
FIG. 8B shows a frequency spectrum of an illustrative signal with two intraband carriers that can be generated at a filter output and that exhibit the same power level during the low power mode in accordance with some embodiments.

"Intraband carrier aggregation" may refer to and be defined herein as a technique for enhancing data rates and overall performance by combining multiple carriers within the same frequency band to transmit and receive data. In contrast, interband carrier aggregation refers to the technique of combining multiple carriers from different frequency bands. When using intraband carrier aggregation, the power control algorithm running on controller 82 should be able to precisely and independently set the power levels of two separate carriers. If mDPD is not active, the power control algorithm may adjust the levels of the carriers to compensate the rippling of the transmit filter 72. FIG. 8A shows a frequency spectrum of an illustrative transmit signal with two intraband carriers 130 (at a first frequency channel Ch1) and 132 (at a second frequency channel Ch2) that can be received at an amplifier input. As shown in FIG. 8A, carriers 130 and 132 can be separately scaled to account for the known filter profile during the low power mode 90. FIG. 8B shows a frequency spectrum of an illustrative signal with two corresponding intraband carriers 131 and 133 that can be generated at the output of filter 72. As shown in FIG. 8B, carriers 131 and 133 that are scaled by the known filter profile/response 102 can exhibit the same power level during the low power mode even when mDPD is deactivated.

Figure 9A:
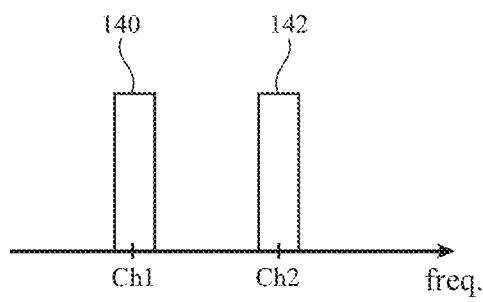
FIG. 9A shows a frequency spectrum of an illustrative signal with two intraband carriers that can be received at an amplifier input and that exhibit the same power level during the high power mode.
Figure 9B:
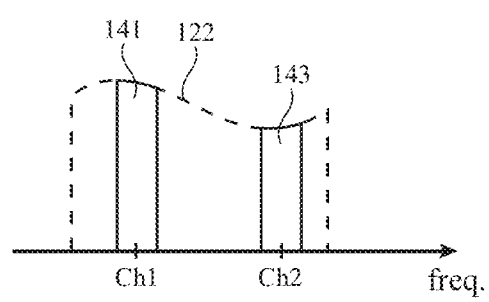
FIG. 9B shows a frequency spectrum of an illustrative signal with two intraband carriers that can be generated at a filter output and that exhibit different power levels due to rippling during the high power mode.

With the activation of mDPD, the flattening effect at the feedback receiver input changes the balance between the two carriers, and since there may be some amount of parasitic rippling on the feedback line 76, the true imbalance is not known. FIG. 9A shows a frequency spectrum of an illustrative signal with two intraband carriers 140 (at a first frequency channel Ch1) and 142 (at a second frequency channel Ch2) that can be received at the input of amplifier 50 and that exhibit the same power level during the high power mode. FIG. 9B shows a frequency spectrum of an illustrative signal with two corresponding intraband carriers 141 and 143 that can be generated at the output of filter 72. As shown in FIG. 9B, carriers 141 and 143 that are scaled by the parasitic rippling of response 122 will cause the power levels of the two carriers to be different. This can be problematic.

Figure 10A:
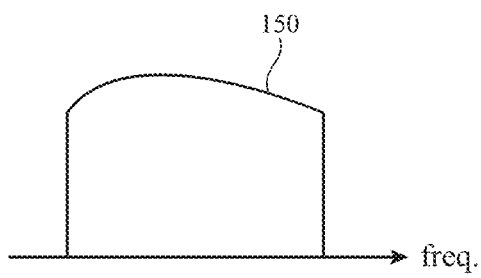
FIGS. 10A and 10B illustrate how channel conditions can change abruptly from one symbol to the next.
Figure 10B:
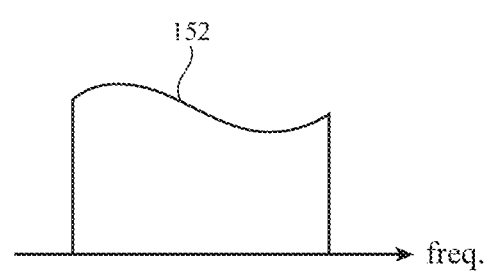

Another potential drawback is that the abrupt activation and deactivation of the mDPD can have an impact on the transmit signal, which can change the shape of the signal dramatically in terms of amplitude ripple and phase/group delay spread. FIGS. 10A and 10B illustrate how channel conditions can change abruptly from one symbol to the next. FIG. 10A shows the frequency spectrum of a signal 150 corresponding to a first symbol N when mDPD is deactivated. FIG. 10B shows the frequency spectrum of a signal 152 corresponding to a subsequent symbol N+1 when mDPD is activated. As shown in FIGS. 10A and 10B, the shape of signal 150 (which is depending on the transmit filter response) and signal 152 (which is dependent on the parasitics of feedback path 76) can be very different from one symbol to the next. Such abrupt changes can be detrimental to the uplink data throughput.

Figure 11:
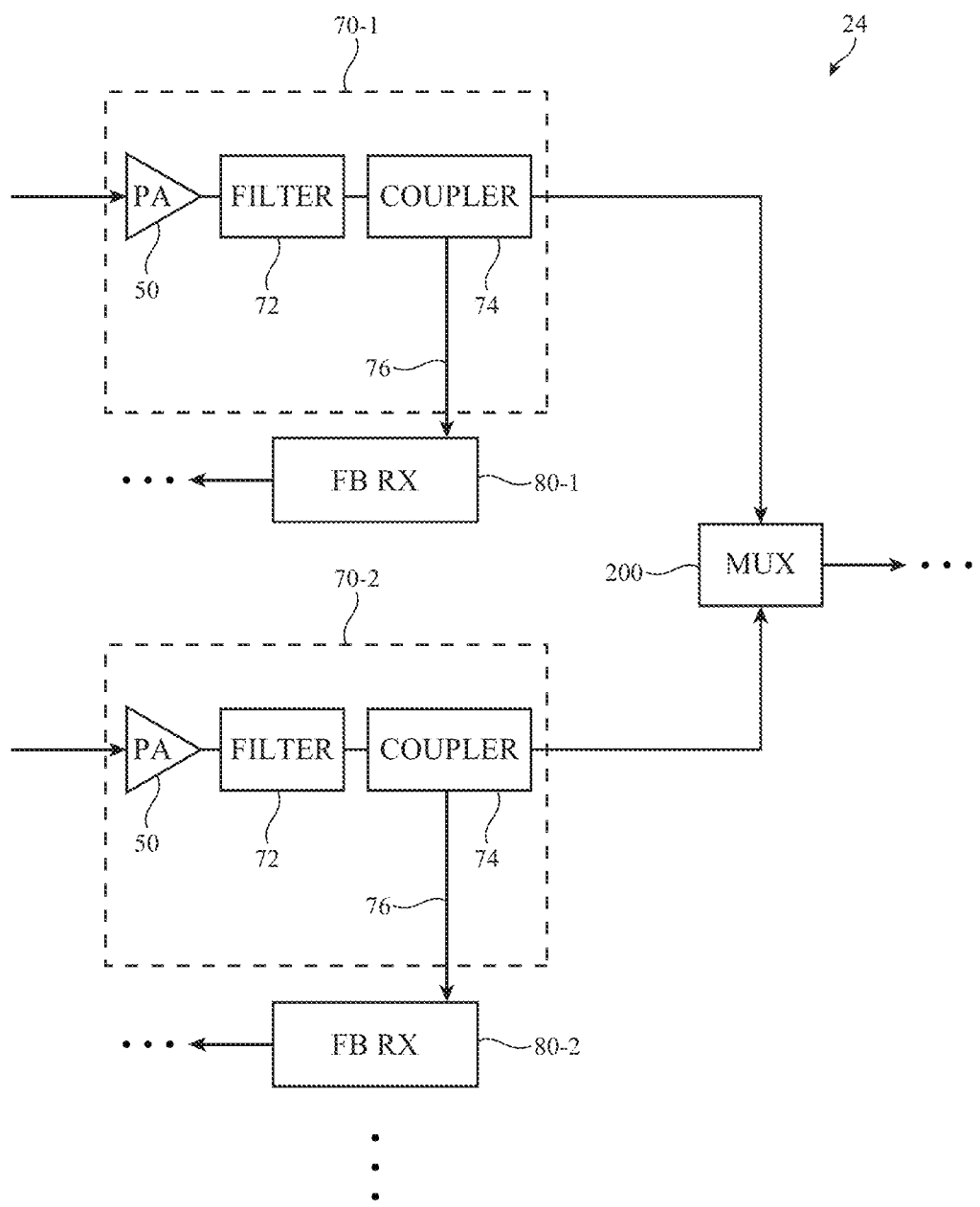
FIG. 11 is a diagram of illustrative wireless circuitry that includes multiple amplifier modules configured to support different frequency bands in accordance with some embodiments.

These problems are exacerbated in transmitter architectures that include additional filters or switchplexers after the RF coupler to accommodate for an increasing number of frequency bands or supported frequency ranges (see, e.g., FIG. 11). As shown in the embodiment of FIG. 11, wireless circuitry 24 can include multiple front end modules such as first module 70-1 and second module 70-2 that are coupled to a multiplexer 200. In practice, the frequency characteristics of multiplexer 200 can have an impact on the power accuracy of the single carriers in intraband carrier aggregation. When mDPD is deactivated, the power accuracy can be ensured by the automatic power control algorithm, which can compensate the combined frequency characteristic of the transmit filter 72 and the cascaded multiplexer 200. When mDPD is activated, however, the mDPD is not able to compensate for the multiplexer response since the effects of multiplexer 200 cannot be seen from the inputs of the various feedback receivers 80-1 and 80-2, etc. Thus, while the total filter contribution in the transmit path can still be calibrated, isolating the feedback path 76 for each front end module 70 can be challenging.

In accordance with some embodiments, an indirect mDPD learning (calibration) methodology is provided that does not compensate the effects of the transmit filter 72. It is recognized herein that any "flattening" of the transmit signal to revert the impact of filter 72 is not a benefit, and should therefore be omitted. It is also recognized herein that if the mDPD only counteracts the non-linearity issues but not the linear contributions of filter 72, then the signal shape would not change abruptly when the activation/deactivation of the mDPD when switching between low power and high power modes. This can be achieved by de-embedding the filtering effect seen by the feedback receiver 80 from the mDPD learning process. Doing so would be technically advantageous and beneficial by providing improved accuracy in intraband carrier aggregation scenarios while also preventing the transmit signal from suddenly changing shape upon mDPD (de) activation.

Figure 12:
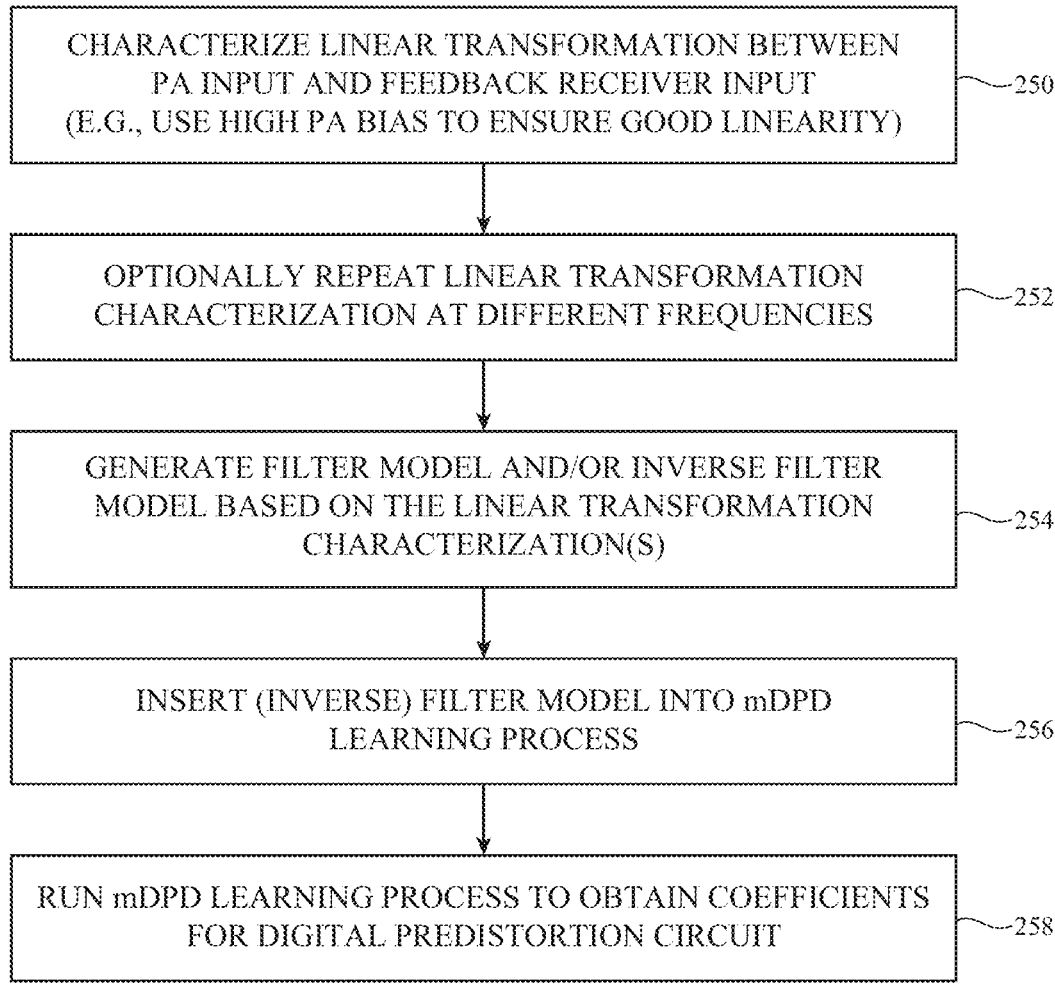
FIG. 12 is a flow chart of illustrative steps for calibrating wireless circuitry of the type shown in FIG. 3 or FIG. 11 in accordance with some embodiments.

FIG. 12 is a flow chart of illustrative steps for calibrating wireless circuitry of the type shown in FIG. 3 or FIG. 11 in accordance with some embodiments. The calibration operations of FIG. 12 can be performed one or more times at a factory/manufacturing facility and/or can be performed one or more times in the field when device 10 is in the possession of an end user. During the operations of block 250, the linear transformation response/profile between the input port of amplifier 50 and the input port of feedback receiver 80 can first be characterized. This linear transformation characterization step can characterize all linear transformation effects between the amplifier input and the feedback receiver input, which would also include the parasitic rippling effects of the feedback path 76. During the operations of block 250, amplifier 50 can be biased using a relative high voltage level to help guarantee optimal linearity at amplifier 50. The increased current consumption as a result of this higher bias point is not a concern since the steps of FIG. 12 are not often performed during normal operation of wireless circuitry 24 and only as needed.

During the operations of block 252, the linear transformation characterization operation of block 250 can optionally be performed at different frequencies (e.g., the initial calibration be done in frequency chunks and can be done for different frequency bands). The linear portion of the frequency response can be calibrated by splitting the frequency spectrum into smaller segments that are easier to handle. The results from each frequency segment can then be recombined.

Figure 13A:
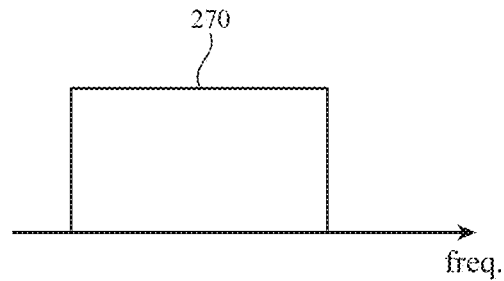
FIG. 13A is frequency spectrum of an illustrative calibration (test) signal that can be received at an amplifier input during calibration in accordance with some embodiments.
Figure 13B:
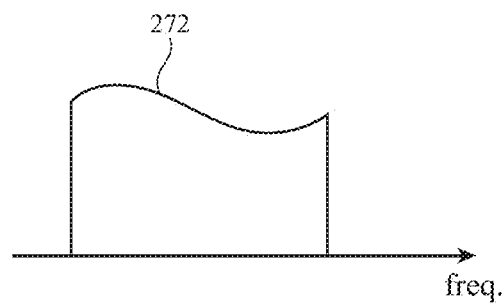
FIG. 13B is a frequency spectrum of an illustrative linearly transformed calibration signal that can be received at a feedback receiver input during calibration in accordance with some embodiments.
Figure 13C:
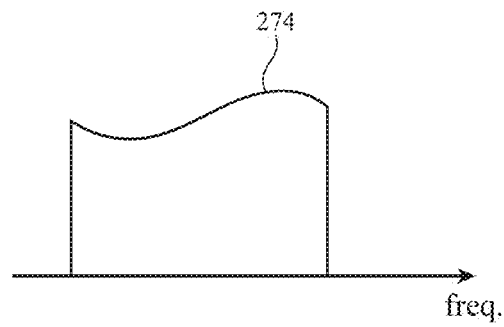
FIG. 13C shows a frequency response of an illustrative inverse filter model in accordance with some embodiments.

During the operations of block 254, a filter model and/or an inverse filter model can be generated based on the linear transformation characterization results obtained from block 250 and/or block 252. Generation of such filter model is best understood in connection with the illustrations of FIGS. 13A, 13B, and 13C. FIG. 13A is frequency spectrum of an illustrative calibration (test) signal 270 that can be received at an amplifier input during the operations of block 250. As shown by FIG. 13A, test signal 270 can have a flat spectrum response. FIG. 13B is a frequency spectrum of an illustrative linearly transformed calibration (test) signal 272 that can be received at the input port of feedback receiver 80 during block 250. The rippling in signal 272 can include the linear effects of transmit filter 72 and also the parasitic effects of feedback path 76. With this data, a filter model (sometimes referred to as a transmit filter model) can be constructed that exhibits the same frequency response as signal 272. The filter model can be implemented as a finite impulse response (FIR) filter, an infinite impulse response (IIR) filter, a median or non-recursive filter, or other types of filter. In some embodiments, an inverse filter model can also be generated. The inverse filter model can be an inverted version of the filter model. The inverse filter model can refer to and be defined herein as a filter that, given the parasitic rippling of the feedback signal will yield the original, flat calibration signal. FIG. 13C can illustrate, for example, a frequency response 274 of an inverse filter model, which is a complement or inverted with respect to the response 272 of FIG. 13B.

Referring back to FIG. 12, the filter model or the inverse filter model obtained from the operations of block 254 can be inserted or incorporate in the mDPD learning process (see operations of block 256). During the operations of block 258, the mDPD learning process can then obtain corresponding mDPD coefficients for the digital predistortion circuit 64. The operations of FIG. 12 are merely illustrative. In some embodiments, one or more of the described operations may be modified, replaced, or omitted. In some embodiments, one or more of the described operations may be performed in parallel. In some embodiments, additional processes may be added or inserted between the described operations. If desired, the order of certain operations may be reversed or altered and/or the timing of the described operations may be adjusted so that they occur at slightly different times. In some embodiments, the described operations may be distributed in a larger system.

Figure 14:
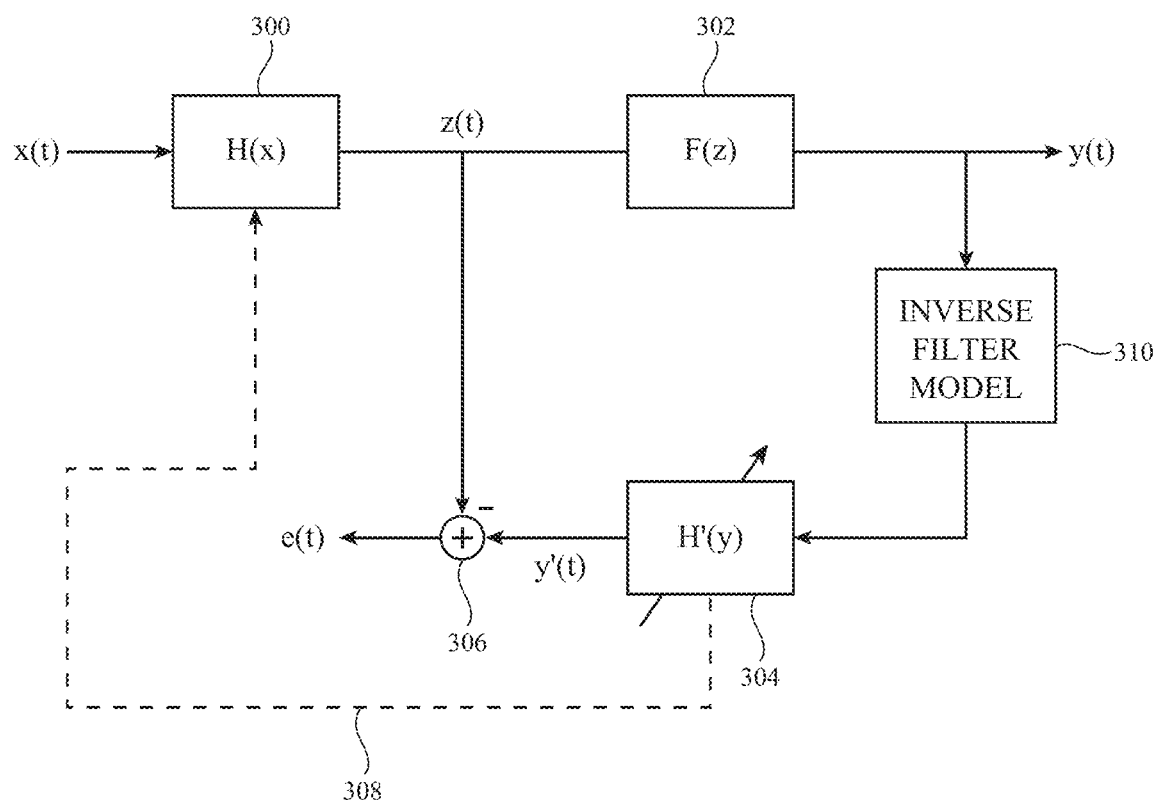
FIG. 14 is a diagram showing how an inverse filter model can be incorporated at an amplifier output during a digital predistortion (DPD) learning process in accordance with some embodiments.

The filter model or the inverse filter model can be incorporated into the mDPD learning process in various ways. FIG. 14 illustrates one embodiment where the inverse filter model is incorporated at the amplifier output port during the mDPD learning process. In FIG. 14, block 300 represents a frequency response H(x) of the digital predistortion circuit 64, where block 300 receives an input x(t) and generates a corresponding output z(t). Signal x(t) may represent a baseband signal, a digital signal, or a transmit signal. Block 302 may represent a frequency response F(z) of the radio-frequency amplifier subsystem, where block 302 receives signal z(t) and generates a corresponding output y(t). Block 302 can include the response of radio-frequency amplifier 50, transmit filter 72, radio-frequency coupler 74, feedback path 76, and/or other components within front end module 70. Block 304 may represent a frequency response H'(y) of feedback receiver 80 or other post-distortion circuit, where block 304 receives signal y(t) and generates a corresponding output y'(t). Signal y'(t) may represent a demodulated signal output by the feedback receiver 80. The mDPD learning process (algorithm) can combine, at combiner component 306, signals z(t) and y'(t) by computing a difference between z(t) and y'(t) to generate an error signal e(t). Block 304 can be an adjustable block that can successively iterate on fine tuning the mDPD coefficients generated on line 308 for controlling block 300. Block 304 can tune the mDPD coefficients with the goal of minimizing the error signal e(t).

In the example of FIG. 14, an inverse filter model 310 can be interposed between the output of block 302 and the input of block 304. Inserting the inverse filter model 310 between blocks 302 and 304 in this way can effectively de-embed the transmit filter effects and the parasitic effects of feedback path 76 since any learning occurring at block 304 already has the linear effects removed by the inverse filter model 310. Performing mDPD calibration in this way can be technically advantageous and beneficial to achieve better accuracy for applications with intraband carrier aggregation, to maintain channel stability when transitioning between low power and high power modes (from symbol to symbol), to help alleviate any bandwidth constraints of feedback receiver 80, and can also help reduce the number of calibration samples needed across different frequency bands.

Figure 15:
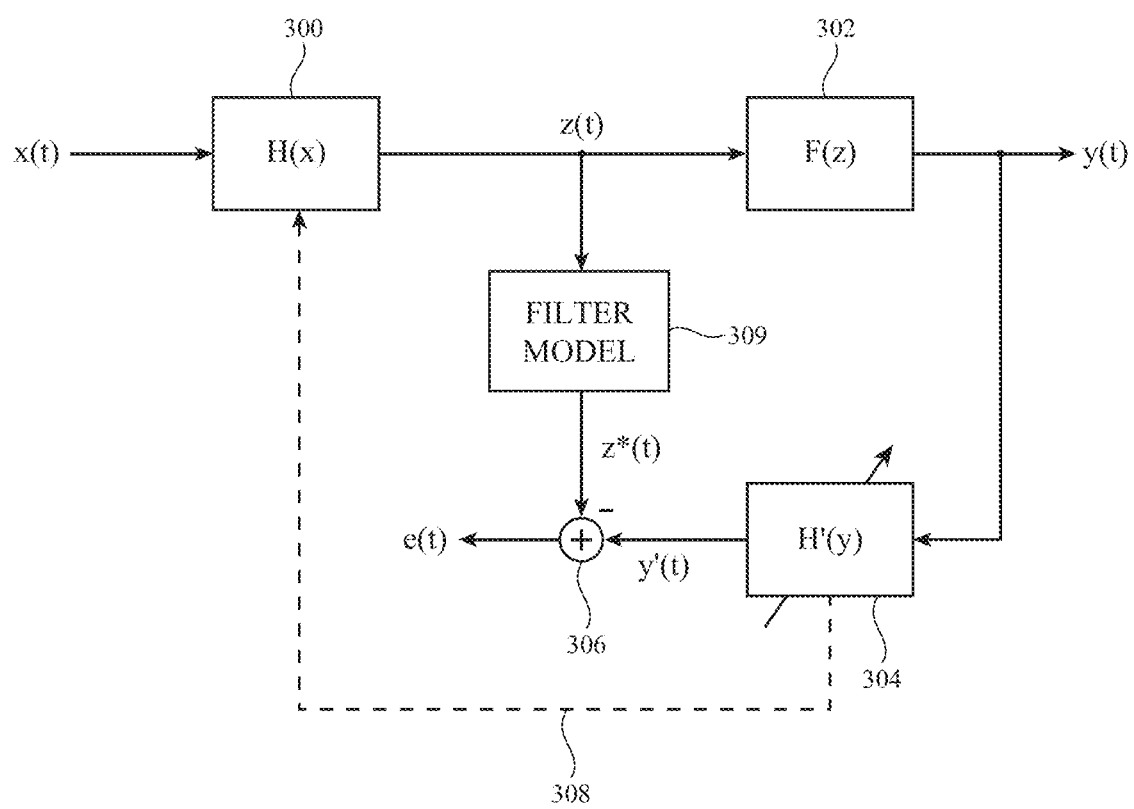
FIG. 15 is a diagram showing how a filter model can be incorporated at an amplifier input during a digital predistortion (DPD) learning process in accordance with some embodiments.

The use of inverse filter model 310 between blocks 302 and 304 in the embodiment of FIG. 14 is exemplary. FIG. 15 illustrates another embodiment where a filter model (i.e., the normal non-inverted filter model) is incorporated at the amplifier input port during the mDPD learning process. Similar to FIG. 14, block 300 of FIG. 15 represents a frequency response H(x) of the digital predistortion circuit 64; block 302 of FIG. 15 represents a frequency response F(z) of the radio-frequency amplifier subsystem; and block 304 of FIG. 15 represents a frequency response H'(y) of feedback receiver 80 or other post-distortion circuit. Block 302 can include the response of radio-frequency amplifier 50, transmit filter 72, radio-frequency coupler 74, feedback path 76, and/or other components within front end module 70.

The mDPD learning process (algorithm) can combine, at combiner component 306, signals y'(t) and a filtered version of z(t), which is denoted as labeled z*(t) in FIG. 15, by computing a difference between y'(t) and the filtered z*(t) to generate an error signal e(t). Signal z(t) can be filtered using filter model 309 to generate z*(t). Block 304 can be an adjustable block that can successively iterate on fine tuning the mDPD coefficients generated on line 308 for controlling block 300. Block 304 can tune the mDPD coefficients with the goal of minimizing the error signal e(t). In the example of FIG. 15, filter model 309 can be interposed between the output of block 300 and an input of combiner 306. Inserting the filter model 309 between block 300 and combiner 306 in this way can effectively de-embed the transmit filter effects and the parasitic effects of feedback path 76 since any learning occurring at block 304 already will have the linear effects canceled out at combiner 306 (since all filter and parasitic effects in the filtered z*(t) will be subtracted from all the filter and parasitic effects in y'(t)). Performing mDPD calibration in this way can be technically advantageous and beneficial to achieve better accuracy for applications with intraband carrier aggregation, to maintain channel stability when transitioning between low power and high power modes (from symbol to symbol), to help alleviate any bandwidth constraints of feedback receiver 80, and can also help reduce the number of calibration samples needed across different frequency bands.

Figure 16:
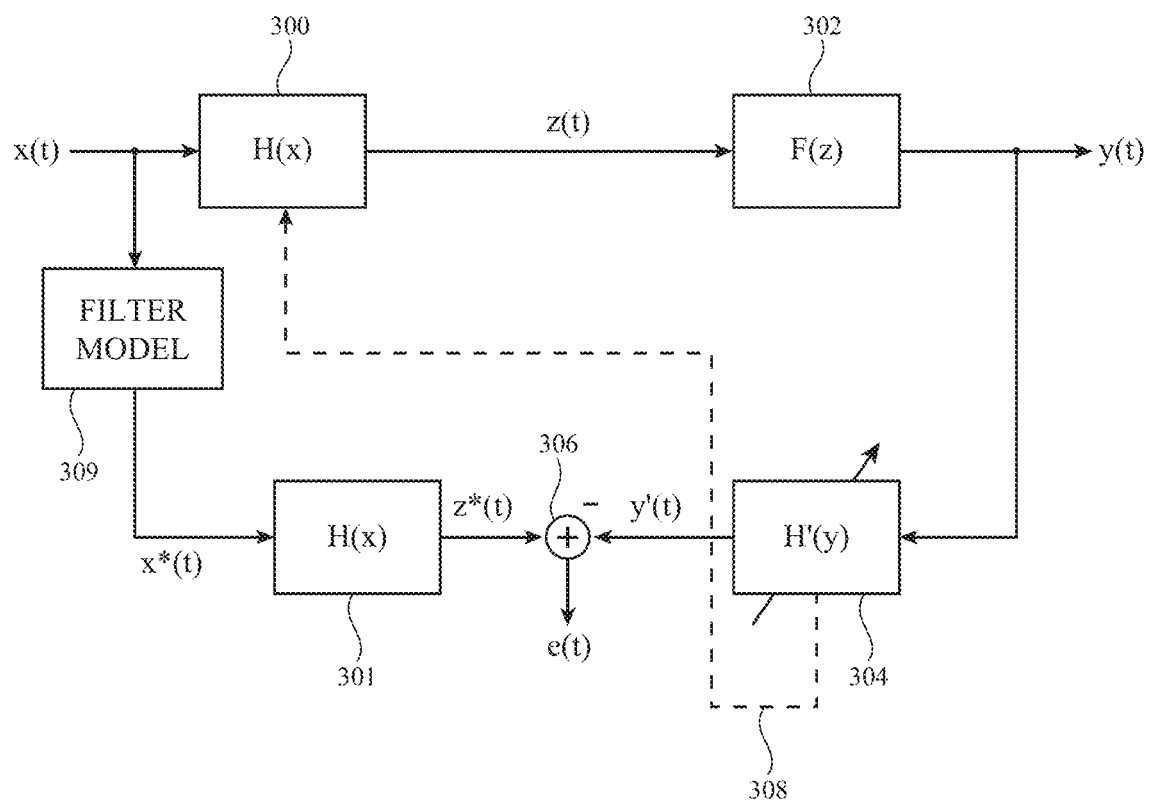
FIG. 16 is a diagram showing how a filter model can be incorporated at a predistorter input during a digital predistortion (DPD) learning process in accordance with some embodiments.

The use of filter model 309 between block 300 and combiner 306 in the embodiment of FIG. 15 is exemplary. FIG. 16 illustrates another embodiment where filter model 309 (i.e., the normal non-inverted filter model) is incorporated at the DPD input port during the mDPD learning process. Similar to FIGS. 14 and 15, block 300 of FIG. 16 represents a frequency response H(x) of the digital predistortion circuit 64; block 302 of FIG. 16 represents a frequency response F(z) of the radio-frequency amplifier subsystem; and block 304 of FIG. 16 represents a frequency response H'(y) of feedback receiver 80 or other post-distortion circuit. Block 302 can include the response of radio-frequency amplifier 50, transmit filter 72, radio-frequency coupler 74, feedback path 76, and/or other components within front end module 70. The embodiment of FIG. 16 can further include a block 301, which represents a frequency response H(x) of the digital predistortion circuit 64. The frequency response of blocks 300 and 301 can be identical.

In the example of FIG. 16, filter model 309 can receive signal x(t) and output a corresponding filtered version of x(t), as denoted by x*(t) in FIG. 16. The filtered x*(t) can be received at block 301, and block 301 can then generate a corresponding z*(t). The mDPD learning process (algorithm) can combine, at combiner component 306, signals z*(t) and y'(t) by computing a difference between z*(t) and y'(t) to generate an error signal e(t). Block 304 can be an adjustable block that can successively iterate on fine tuning the mDPD coefficients generated on line 308 for controlling block 300. Block 304 can tune the mDPD coefficients with the goal of minimizing the error signal e(t).

In the example of FIG. 16, filter model 309 can be interposed between the inputs of blocks 300 and 301. Inserting additional filter model 309 at the input port of block 301 in this way can effectively de-embed the transmit filter effects and the parasitic effects of feedback path 76 since any learning occurring at block 304 already will have the linear effects canceled out at combiner 306 (since all filter and parasitic effects in the filtered z*(t) will be subtracted from all the filter and parasitic effects in y'(t)). Performing mDPD calibration in this way can be technically advantageous and beneficial to achieve better accuracy for applications with intraband carrier aggregation, to maintain channel stability when transitioning between low power and high power modes (from symbol to symbol), to help alleviate any bandwidth constraints of feedback receiver 80, and can also help reduce the number of calibration samples needed across different frequency bands. The example of FIG. 16 in which filter model 309 precedes block 301 is illustrative. In another embodiment, the order of blocks 309 and 301 can be swapped (e.g., block 301 can precede filter model 309).

The various embodiments of FIGS. 14-16 for de-embedding the transmit filter characteristics, the parasitic characteristics of feedback path 76, and other linear characteristics of the front end module are illustrative. The mDPD coefficients obtained using the operations of FIGS. 14-16 can be applied to the digital predistortion block such that the transmit path is configured to transmit a predistorted signal based on the mDPD coefficients. Other ways of de-embedding such types of linear characteristics or effects associated with the radio-frequency front end module can optionally be employed without departing from the scope or spirit of the present embodiments. In general, the mDPD calibration techniques described above can be applied to intraband carrier aggregation applications and wireless architectures of the type described in the connection with FIG. 11 with cascaded filters/switches for supporting a wide range of operating frequencies.

The methods and operations described above in connection with FIGS. 1-16 may be performed by the components of device 10 using software, firmware, and/or hardware (e.g., dedicated circuitry or hardware). Software code for performing these operations may be stored on non-transitory computer readable storage media (e.g., tangible computer readable storage media) stored on one or more of the components of device 10 (e.g., storage circuitry 16 and/or wireless communications circuitry 24 of FIG. 1). The software code may sometimes be referred to as software, data, instructions, program instructions, or code. The non-transitory computer readable storage media may include drives, non-volatile memory such as non-volatile random-access memory (NVRAM), removable flash drives or other removable media, other types of random-access memory, etc. Software stored on the non-transitory computer readable storage media may be executed by processing circuitry on one or more of the components of device 10 (e.g., processing circuitry in wireless circuitry 24, processing circuitry 18 of FIG. 1, etc.). The processing circuitry may include microprocessors, application processors, digital signal processors, central processing units (CPUs), application-specific integrated circuits with processing circuitry, or other processing circuitry.

The foregoing is merely illustrative and various modifications can be made to the described embodiments. The foregoing embodiments may be implemented individually or in any combination.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A method of operating wireless circuitry having a radio-frequency amplifier, the method comprising:
   characterizing a linear transformation between an input of the radio-frequency amplifier and an input of a feedback receiver, wherein the radio-frequency amplifier has an output that is coupled to the input of the feedback receiver via a filter and a radio-frequency coupler;
   obtaining a filter model based on the characterized linear transformation between the input of the radio-frequency amplifier and the input of the feedback receiver;
   generating memory digital predistortion (mDPD) coefficients via a learning process while de-embedding the filter model from the learning process; and
   transmitting a predistorted signal based on the mDPD coefficients.

2. The method of claim 1, further comprising:
   during the linear transformation characterization, biasing the radio-frequency amplifier in a linear region of operation.

3. The method of claim 1, further comprising:
   characterizing a linear transformation between the input of the radio-frequency amplifier and the input of the feedback receiver at a plurality of frequencies.

4. The method of claim 1, wherein the filter model is implemented as a finite impulse response filter or an infinite impulse response filter.

5. The method of claim 1, further comprising:
   obtaining an inverse filter model based on the filter model, wherein the generation of the mDPD coefficients is based on the inverse filter model and includes filtering, with the inverse filter model, signals output from the radio-frequency amplifier.

6. The method of claim 1, further comprising:
   applying the mDPD coefficients to a digital predistortion block coupled to the input of the radio-frequency amplifier.

7. The method of claim 6, wherein wherein the learning process comprises:
   with the filter model, filtering signals output from the digital predistortion block.

8. The method of claim 6, wherein the learning process further comprises:

with the digital predistortion block, receiving a baseband signal;

with the filter model, filtering the baseband signal to generate a corresponding filtered signal; and with an additional digital predistortion block, receiving the filtered signal and outputting a corresponding signal for generating the mDPD coefficients.

9. The method of claim 6, wherein the learning process comprises:

minimizing an error signal computed from a difference between a predistorted signal output from the digital predistortion block and a demodulated signal output from the feedback receiver.

10. The method of claim 6, wherein the wireless circuitry is operable in a first power mode and a second power mode different than the first power mode, and wherein the digital predistortion block is deactivated during the first power mode and is activated during the second power mode.

11. A method comprising:

obtaining a filter model that characterizes effects between an input of a radio-frequency amplifier and an input of a feedback receiver, wherein the radio-frequency amplifier has an output that is coupled to the input of the feedback receiver via a filter and a radio-frequency coupler;

obtaining an inverse filter model based on the filter model;

generating memory digital predistortion (mDPD) coefficients based on the inverse filter model; and transmitting a predistorted signal based on the mDPD coefficients.

12. The method of claim 11, further comprising:

characterizing a linear transformation between the input of the radio-frequency amplifier and the input of the feedback receiver while the radio-frequency amplifier is biased in a linear mode.

13. The method of claim 11, further comprising:

characterizing a linear transformation between the input of the radio-frequency amplifier and the input of the feedback receiver at a plurality of frequencies.

14. The method of claim 11, wherein generating the mDPD coefficients comprise:

with the inverse filter model, filtering signals output from the radio-frequency amplifier.

15. The method of claim 11, wherein generating the mDPD coefficients comprises:

minimizing an error signal computed from a difference between the predistorted signal and a demodulated signal output from the feedback receiver.

16. A method comprising:

obtaining a filter model that characterizes effects between an input of a radio-frequency amplifier and an input of a feedback receiver, wherein the radio-frequency amplifier has an output that is coupled to the input of the feedback receiver via a filter and a radio-frequency coupler;

generating memory digital predistortion (mDPD) coefficients by filtering, with the filter model, the predistorted digital signal to generate a corresponding filtered signal; and predistorting a digital signal based on the mDPD coefficients.

17. The method of claim 16, further comprising:

characterizing a linear transformation between the input of the radio-frequency amplifier and the input of the feedback receiver while the radio-frequency amplifier is biased in a linear mode.

18. The method of claim 16, further comprising:

characterizing a linear transformation between the input of the radio-frequency amplifier and the input of the feedback receiver at a plurality of frequencies.

19. The method of claim 16, wherein generating the mDPD coefficients further comprises:

minimizing an error signal computed from a difference between the filtered signal output from the filter model and a demodulated signal output from the feedback receiver.

* * * * *